Dec. 18, 1962  M. C. KIRKPATRICK  3,068,753
HEAT-REFLECTIVE LIGHT-TRANSMITTING PANEL
Filed March 29, 1957
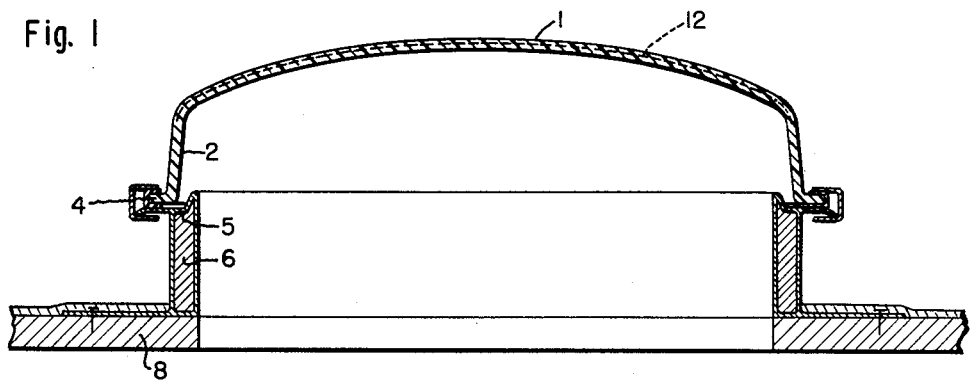
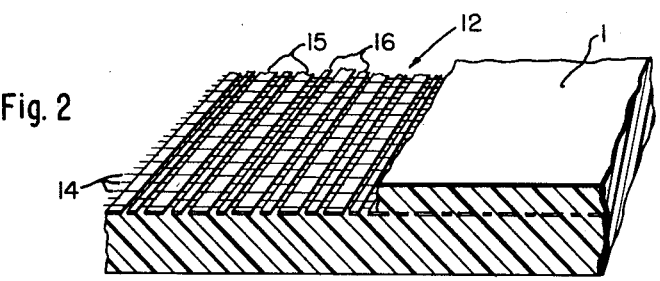
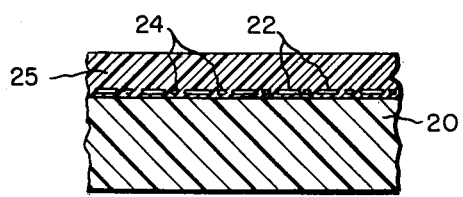
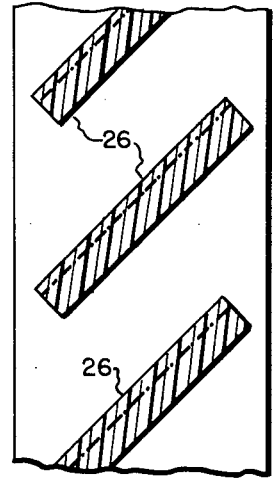
INVENTOR.
MAURICE C. KIRKPATRICK
BY
KENWAY, JENNEY, WITTER & HILDRETH
ATTORNEYS

United States Patent Office 3,068,753
Patented Dec. 18, 1962

3,068,753
HEAT-REFLECTIVE LIGHT-TRANSMITTING PANEL
Maurice C. Kirkpatrick, Arlington, Mass., assignor, by mesne assignments, to American Cyanamid Company, New York, N.Y., a corporation of Maine
Filed Mar. 29, 1957, Ser. No. 649,344
4 Claims. (Cl. 88—57.5)

In modern building construction it is the practice to provide panels and domes to admit and/or disperse light so as to satisfy the requirements of the particular installation. Customarily these panels and domes are either clear or translucent, but both types have certain objectionable features, namely—the clear type provides a glare which does not permit uniform illumination, while the translucent type, although being effective to disperse light, tends to produce a heat build-up since little of the incident light and heat waves are reflected back to the outside and consequently it is sometimes necessary to provide one or more vents.

The principal objects of the present invention are to overcome the aforementioned objections, to provide a panel which not only permits the entry of a predetermined amount of dispersed light, but also the transmission of direct light without producing glare, and to provide an efficient and reliable method of producing such a skylight.

Other objects are to provide a panel which will withstand adverse weather conditions without impairment of its efficiency and to provide a skylight which may be advantageously used in various environments ranging from low humidity arid climates to the humid atmospheres encountered at the sea coast.

Further objects will be apparent from a consideration of the following description and the accompanying drawings, wherein:

FIG. 1 is a vertical section through a skylight having a reflective, light-transmitting dome constructed in accordance with the present invention;

FIG. 2 is an enlarged section through the concave-convex area of the skylight;

FIG. 3 is an exaggerated section, similar to FIG. 2, showing a modified type of reflective, light-transmitting panel; and FIG. 4 is a fragmentary section through a jalousie having panels made in accordance with the present invention.

In accordance with the present invention I provide a panel composed of a transparent plastic having a high light transmission, preferably of the order of 90%, and inwardly of the outer of exposed surface of the panel is a light and heat-reflective, light-transmitting material which is effective to reflect at least approximately 50% of the light and heat waves striking its outer surface and transmit less than 50% of such waves. The transparent plastic should be capable of withstanding a wide range of weather conditions and have adequate structural strength, and although various materials are available, practical considerations suggest the use of polymerized methyl methacrylate because of its clarity, high light transmission (approximately 90%), good weathering and moldability.

The light-reflective, light-transmitting material comprises any of the various materials which will not only reflect a substantial amount of light and heat waves, but also transmit unreflected light waves, for example, a metalized woven fabric wherein the warp threads consist of non-opaque fibers, natural or synthetic, and the filler consists of strands of metal foil or metalized strips alternating with non-opaque threads. Such a fabric may be embedded within the transparent plastic sheet and to this end the fabric may be immersed in a monomer or a partly polymerized polymeric liquid such as methyl methacrylate in a shallow mold, after which the polymerization is completed. The resulting sheet, due to the stretchability of the fabric, may be molded by any of the techniques well known to the art to produce a so-called plastic bubble or dome, or other desired shape. In the resulting structure virtually all of the light and heat waves striking the outer surface are transmitted through the plastic until they strike the metalized fabric, whereupon the waves striking the relatively opaque metal strands or metalized strips are reflected outwardly, while those striking the non-opaque threads are transmitted through the material in the form of dispersed waves which pass through the panel or dome.

The ratio of reflected to transmitted light should be at least approximately 1:1 for relatively humid climates since the intensity of light is not nearly as great as in the dry, relatively arid climates where the ratio should be approximately 3 to 1 or more in order to avoid excessive heat build up. In the case of skylights where maximum illumination is desired, the lower part of the dome-like member may be integral with a vertically depending skirt adapted to project upwardly from the skylight well to permit the entry of a greater amount of indirect light. However, the use of the reflective, light-transmitting material may be confined to the dome-like member since very little direct sunlight, as distinguished from indirect or reflected light, actually passes through the skirt portion during those parts of the day when the sun is most effective.

Although a metallic or metalized fabric is highly satisfactory, any type of sheet material having uniformly disposed opaque, reflective areas and light permeable areas may be effectively employed. In order to minimize absorption of light and heat waves and enhance efficiency, the reflective material should preferably be nearer to the outer or exposed surface of the panel than to the inner surface.

If desired, the reflective sheet material may be interposed between two preformed panels and the assemblage integrated by a suitable cement such as a polymerizable monomer, e.g., methyl methacrylate containing a catalyst. Alternatively, the reflective sheet material may be applied to the partly or fully polymerized panel while still in the mold and a polymerizable liquid monomer poured over the sheet, after which the monomer is polymerized so as to integrate the assemblage.

Referring to FIGS. 1 and 2 of the accompanying drawings, the numeral 1 designates a dome-like member having an integral depending skirt 2, the lower part of which terminates in an outwardly directed flange 4 seated on and secured to a gutter 5 carried by the upstanding curb 6 of the frame 8 surrounding the skylight well. Since the gutter 5, curb 6, attaching angle 10 and associated seals are more or less conventional, being more fully disclosed in the Wasco Products catalogue (copyright 1956) a further description of these parts is unnecessary.

Embedded within and coextensive with the concavo-convex area of the dome-like member 1 is a piece of fabric 12 consisting of warp threads 14 of non-metallic fibers such as rayon, cotton or the like, and filler strands 15 of metalized plastic strips alternating with threads 16 of rayon or cotton which constitute spacers. The metalized strands 15 are relatively opaque and hence reflect light and heat waves, while the threads 14 and 16, being non-opaque, not only transmit light, but also effectively disperse the light due to their constitutent filaments. The reflective faces of the metalized strands 15 are parallel with the outer surface of the panel as shown in FIGS. 2 and 3 of the drawings.

In preparing the dome-like structure a shallow mold is filled to about two thirds of its depth with a partly polymerized but liquid methyl methacrylate which is more or less viscous, and the fabric 12 is then laid on the surface and cautiously immersed so as to prevent occlusions of air, after which additional partly polymerized liquid methyl methacrylate is added to fill the mold. Polymerization is then carried on to completion in the usual manner to provide a sheet having the fabric 12 completely embedded therein. The sheet thus produced is then placed in a vacuum or pressure bag mold to produce the final form of the dome-like member including the skirt 2 and flange 4.

Alternatively, a polymerized sheet 20 (FIG. 3) of methyl methacrylate may first be prepared and a reflective sheet having relatively opaque reflective areas 22 alternating with non-opaque, light transmitting and dispersing areas 24 is applied to the surface of the sheet 20. Liquid monomer is then applied so as to penetrate the reflective sheet, after which a second sheet 25 is applied or formed in situ and the assemblage is then subjected to sufficient heat and pressure to integrate the structure, thus producing a flat panel having the aforementioned properties. Such a panel may be cut up into slats 26 and used in making jalousie-type structures as shown in FIG. 4.

In each of the embodiments herein shown the ratio of reflectivity to transmission is at least approximately 1:1 and may as a practical matter go as high as 4:1 for arid climates. In any case at least approximately 50% of direct sunlight striking the panel or dome-like member is reflected back to the outside and the balance, except for a minor amount that is absorbed, is transmitted through the panel or dome as dispersed light. Consequently both heat build up and glare are minimized, if not eliminated. In addition to the light transmitted through the dome 1, indirect light waves are transmitted through the skirt 2 so that a greater amount of illumination is obtained than would otherwise be possible.

While I have shown and described different desirable embodiments of the invention it is to be understood that this disclosure is for the purpose of illustration and that various changes and modifications may be made without departing from the spirit and scope of the invention.

I claim:

1. A heat reflective, light transmitting rigid panel composed of polymerized methyl methacrylate and a single layer of metalized cloth embedded within said panel with said cloth parallel to and substantially closer to one surface than the other, said metalized cloth having relatively opaque reflective strips interwoven with non-metallic threads, the reflective strips being present in an amount to reflect at least approximately 50% of the light and heat waves striking said panel and said nonmetallic threads being effective to transmit and diffuse the light waves passing through said panel.

2. A skylight comprising a curved dome-like member composed of transparent plastic having a high light transmission, said dome having a top portion with a depending sidewall continuous with said top portion, a single layer of reflective, light transmitting material embedded in said top portion inwardly of its outer surface and parallel therewith, said material comprising reflective strands alternating with light transmitting fiber threads, the ratio of reflectivity to transmission of said material being at least approximately 1:1 so that at least approximately 50% of the direct waves striking said outer surface are reflected back and the balance are transmitted through the dome like member, said sidewall adapted to pass substantially all the light impinging thereon.

3. A skylight as set forth in claim 2 wherein said sidewall is formed continuously about the periphery of said top portion.

4. A skylight comprising a curved dome-like member composed of transparent plastic having a high light transmission, said dome having a top portion, a single layer of reflective light transmitting material embedded in said top portion inwardly of and parallel with its outer surface, said material being a layer of cloth comprising reflective strands alternating with light transmitting fiber threads, the ratio of reflectivity to transmission of said cloth being at least approximately 1:1 so that at least approximately 50% of the direct waves striking said outer surface are reflected back and the balance are transmitted through the dome-like member, said dome having a peripheral portion depending from said top portion providing an area adapted to pass substantially all the light impinging thereon.

References Cited in the file of this patent

UNITED STATES PATENTS

| | | |
|---|---|---|
| 1,580,287 | Colle et al. | Apr. 13, 1926 |
| 1,937,342 | Higbie | Nov. 28, 1933 |
| 2,081,538 | Hoarle | May 25, 1937 |
| 2,232,551 | Merton | Feb. 18, 1941 |
| 2,242,567 | Bodde | May 20, 1941 |
| 2,280,358 | Tietig | Apr. 21, 1942 |
| 2,322,591 | Rapp | June 22, 1943 |
| 2,327,918 | Miller | Aug. 24, 1943 |
| 2,381,542 | Hyatt et al. | Aug. 7, 1945 |
| 2,382,566 | Heckman | Aug. 14, 1945 |
| 2,774,421 | Lion | Dec. 18, 1956 |
| 2,858,734 | Boyd | Nov. 4, 1958 |
| 2,874,612 | Luboshez | Feb. 24, 1959 |

FOREIGN PATENTS

| | | |
|---|---|---|
| 1,003,366 | France | Nov. 14, 1951 |

OTHER REFERENCES

Building News, October 1939, page 29, "Largest Glass-Crete Roof Permits High Daylight Illumination," by Staal et al.